United States Patent [19]

Mody

[11] Patent Number: 5,317,340
[45] Date of Patent: May 31, 1994

[54] METHOD AND DEVICE FOR ERASING AND WRITING ON MAGNETIC RECORDING MEDIA SUITABLE FOR DIRECT VIEWING

[76] Inventor: Hemant K. Mody, 200 White Rabbit Trail, Rochester, N.Y. 14612

[21] Appl. No.: 571,939

[22] Filed: Aug. 23, 1990

[51] Int. Cl.$^5$ .............................................. G11B 9/00
[52] U.S. Cl. ..................... 346/74.3; 346/21; 346/74.5
[58] Field of Search ........ 346/74.3, 74.5, 21; 360/66, 110, 118, 123, 39, 128

[56] References Cited

U.S. PATENT DOCUMENTS

| | | | |
|---|---|---|---|
| 3,613,101 | 10/1971 | Leonard et al. | 346/74.5 |
| 3,633,720 | 1/1972 | Tyler | 346/74.5 |
| 3,699,587 | 10/1972 | Currie | 346/74.3 |
| 3,845,499 | 10/1974 | Ballinger | 360/56 |
| 3,860,796 | 1/1975 | Wallace et al. | 235/61.12 M |
| 3,879,754 | 4/1975 | Ballinger | 360/56 |
| 3,947,879 | 3/1976 | Stuuffer | 360/56 |
| 4,157,581 | 6/1979 | Keiichi et al. | 360/66 |
| 4,323,933 | 4/1982 | Fichter | 346/74.3 |
| 4,366,488 | 12/1982 | Westwood et al. | 346/74.3 |
| 4,646,107 | 2/1987 | Shimizu et al. | 346/74.5 |
| 4,675,476 | 6/1987 | Kobayashi | 346/74.5 |
| 5,095,317 | 3/1992 | Takei | 346/74.2 |
| 5,109,311 | 4/1992 | Hanazono et al. | 360/119 |
| 5,119,255 | 6/1992 | Gooch | 360/115 |

OTHER PUBLICATIONS

Dale O. Ballinger, "Magnetic Recording Paper is Erasable", Electronics, Mar. 1, 1973, McGraw Hill, 1221 Avenue of the Americas, New York, N.Y.

Guide to Writing and Erasing POP Magnetic Paper Available from Eurand America Inc., 845 Center Drive, Vandalia, Ohio 45377.

*Primary Examiner*—Benjamin R. Fuller
*Assistant Examiner*—Randy W. Gibson

[57] ABSTRACT

Method and devices for erasing and writing on magnetic particle oriented media are described. Erasure is caused by moving a magnetic field which enters and exits the media at a finite angle but stays parallel to the media in some region. A magnetic stencil comprising regions of dissimilar permeabilities is described. The magnetic stencil can be used in conjunction with the erasure means to simultaneously create alternating fields parallel and normal to the media thereby permitting information to be written over any previously recorded information without requiring a seperate erasure step.

16 Claims, 4 Drawing Sheets

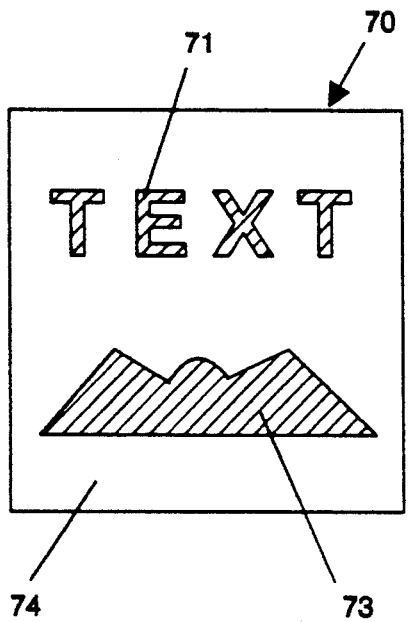
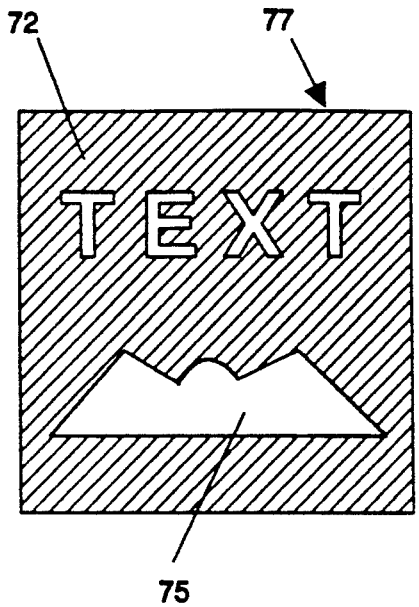
FIGURE 5A
FIGURE 5B
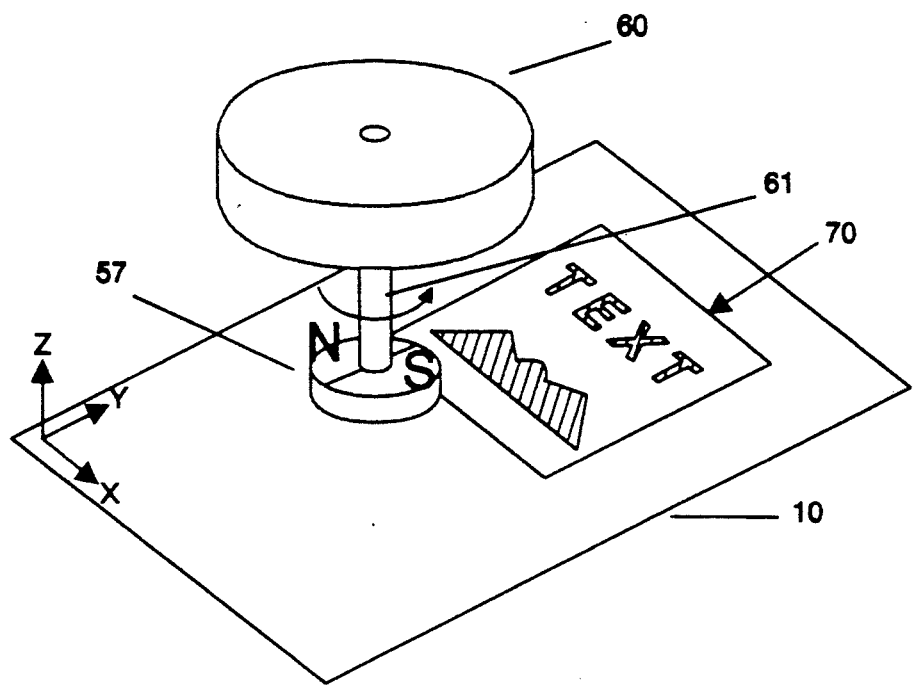
FIGURE 5C

METHOD AND DEVICE FOR ERASING AND WRITING ON MAGNETIC RECORDING MEDIA SUITABLE FOR DIRECT VIEWING

BACKGROUND—FIELD OF INVENTION

This invention relates to method and device for creating magnetic fields required to erase and write on magnetic recording media suitable for direct viewing.

BACKGROUND—DESCRIPTION OF PRIOR ART

A type of magnetic recording media suitable for direct viewing comprises numerous microscopic magnetic flakes microencapsulated in an oily suspension and coated on a substrate such as paper or plastic film. When these particles are aligned parallel to the surface on which they are coated, the media appears light since the incident light is reflected. In areas where the particles are oriented normal to the surface, incident light is scattered and these regions appear dark. If the light source and the viewer are on opposite sides of the media, areas where the particles are aligned normal to the surface appear light and areas with the particles are aligned parallel to the surface appear dark. The type of magnetic media described above is commonly described in literature as Particle Oriented Paper or POP. In what follows, the recording media will be referred to as POP for brevity.

A description of the manufacturing process, method for writing and erasing POP can be found in an article authored by Dale O. Ballinger and published in Electronics, Mar. 1, 1973, Copyright 1973 by McGraw-Hill Inc. 1221 Avenue of the Americas, New York, N.Y. 10020. POP is currently manufactured by Eurand America Inc., 845 Center Drive, Vandalia, Ohio 45377. A 'Guide to Writing and Erasing POP Magnetic Paper' is also available from Eurand America Inc.

In the prior art, recording information on POP requires two steps. The first step, known as erasure comprises orienting the flakes parallel to the POP surface. This step is also known as preorienting. Erasure requires the application of magnetic field in the POP plane and changing direction in time. An erasure apparatus is described within U.S. Pat. No. 3,845,499 by Dale O. Ballinger. It comprises a combination of a fixed and time varying magnetic field components, normal to each other but essentially inplane of the POP. The fixed field is generated using permanent magnets with their magnetic axis parallel to the POP surface. A coil wound around the POP produces the time varying field normal to the permanent magnet field, thus creating a rotating field vector causing erasure of the POP. Another scheme described within U.S. Pat. No. 3,879,754 also by Dale O. Ballinger utilizes two opposing U-shaped electromagnets, each comprising a direct current-carrying coil and an alternating current carrying coil. The POP is placed centered between the two electromagnets and experiences an erasure field. An advantage of this scheme is that the POP need not be looped through a coil, a feature useful in recorders such as circular chart recorders. Disadvantages of these erasure schemes are:

(a) In one scheme, the POP must be passed through a coil.

(b) The alternating current through the coil requires access to an alternating current power source or expensive battery and inverter alternating current power supply.

(c) The efficiency of the erasure process is low.

Another device for erasing POP is described in U.S. Pat. No. 4,323,933 by Manfred Fichter. This device utilizes a bar magnet or a disk magnet with its magnetization axis parallel to the POP. The stray field of the magnet is deemed parallel to the POP surface. The magnet is moved transverse to the direction of POP motion and is said to cause erasure. Since a small fraction of the magnet field is useful for erasure, the magnet is not well utilized. Furthermore, the field enters and exits the POP at a finite (non-zero) angle, and the flux density in these regions will be larger than in the region where the flux lines are parallel to the POP, this erasure scheme creates a uniform "gray" state. This gray state is a state of particle orientation between the extreme maximum "light" and "dark" states. New information is written by creating a dark trace surrounded by two light seams. It will be appreciated that this scheme is not suitable for creating the preferred erasure state of uniform maximum reflectance as for example possible with the Ballinger methods described earlier.

In the prior art, writing on POP is accomplished using a permanently magnetized steel pin. Better contrast is obtained using a soft iron pin with an alternating current carrying coil wound around it. Disadvantages of the prior art writing methods are:

(a) To obtain a good contrast, an alternating current source is required.

(b) Any previously written information on the POP must be first erased before new information can be written.

OBJECTS AND ADVANTAGES

Objects and advantages of my present invention are:

(a) a method for erasing POP requiring access only from one side of the POP;

(b) to obviate the need for an alternating current source;

(c) to provide an efficient erasure method;

(d) to provide an erasure state of high reflectance;

(e) to provide the capability to write new information on the POP without seperately erasing any earlier recorded information.

BRIEF DESCRIPTION OF THE DRAWINGS

FIGS. 5 A and 5 B show the plan view of two examples of magnetic stencils.

FIG. 5 C shows a two pole disk permanent magnet 57 driven by motor 60 via shaft 61 and placed adjacent to the POP 10 with a magnetic stencil 70 placed between magnet 57 and POP 10.

DETAILED DESCRIPTION OF PREFERRED EMBODIMENTS

Figure 1:
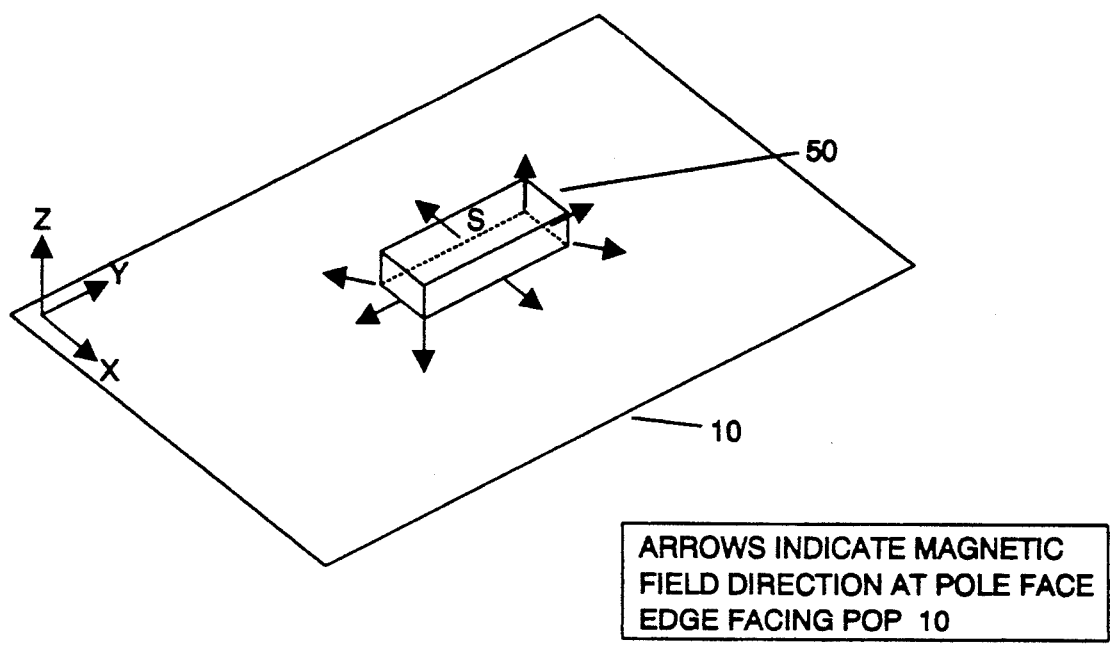
FIG. 1 shows a permanent magnet 50 placed adjacent to the POP 10.

In FIG. 1, permanent magnet 50 is placed on top of the POP 10 to be erased. The magnetic axis of magnet 50 is normal to POP 10 and the magnetic particles lying beneath the surface of the magnet will be aligned essentially normal to the surface of POP 10. At the periphery of the magnet 50 in the plane of the magnet surface facing the POP 10, the flux lines are essentially parallel to the surface of the POP 10 and here the magnetic particles in the POP 10 align themselves parallel to the POP 10 surface. Further away from the magnet periphery, the magnetic field due to magnet 50 gradually changes direction and magnitude such that as it becomes more normal to the POP 10 surface, its magnitude drops. If magnet 50 is moved along the surface of the POP 10 parallel or nearly parallel to say the X-Axis, magnetic particles in the POP 10 near the magnet 10 edges parallel to the X-Axis experience a magnetic field parallel to the POP 10 surface and changing direction in time. Thus the erasure requirements are met in the POP 10 in the region adjacent to magnet edges parallel to the X-Axis. Furthermore, if the magnet 50 is gradually moved along the Y-Axis following or during one or more X-Axis scans, the erasure region can be extended in the Y direction and in this manner, any region of the POP 10 can be erased.

Figure 2:
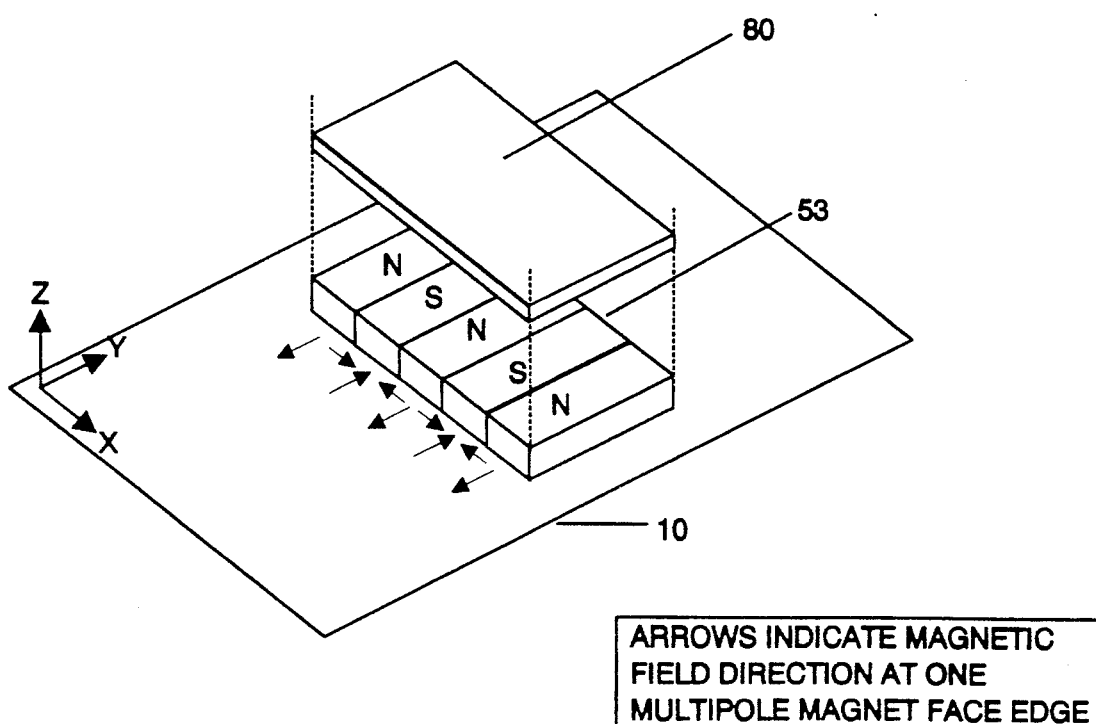
FIG. 2 shows a multipole permanent magnet 53 with a steel backing plate 80 placed adjacent to the POP 10.

Erasure can be more effective if instead of using a single pole of a two pole magnet, a multipole magnet is used as shown in FIG. 2. Here, moving magnet 53 along the X-Axis causes the POP 10 to experience an in plane magnetic field changing direction through 360° with time in the region adjacent to the magnet 53 edges parallel to the X-Axis. Again, gradually moving the magnet 53 along the Y-Axis increases the region of erasure of the POP 10. Erasure effectiveness can be increased by providing a flux plate 80 on the back of the magnet.

Figure 3:
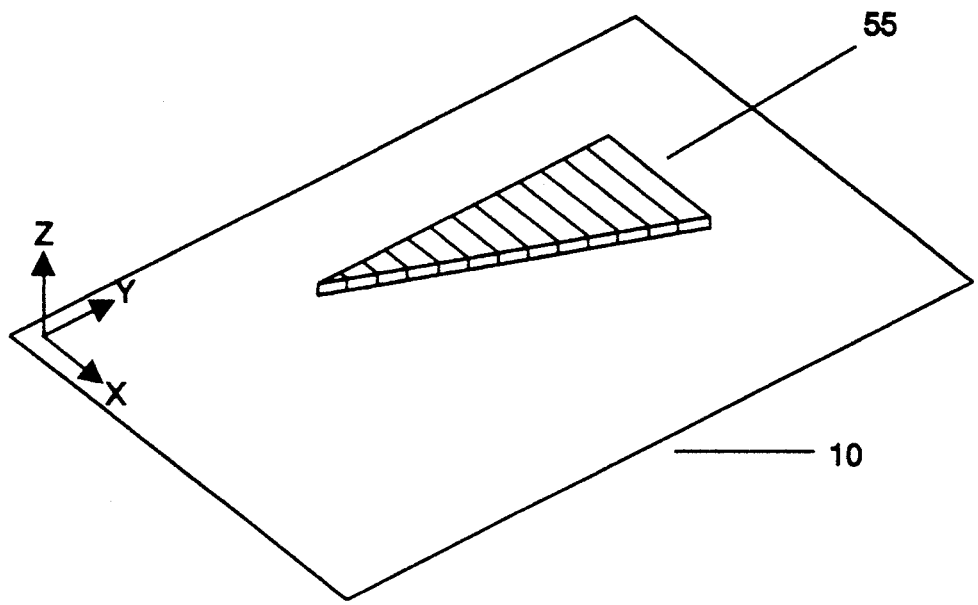
FIG. 3 shows a triangular multipole permanent magnet 55 placed adjacent to the POP 10.

It will be obvious to one skilled in the art, that both the X and Y axis motions described above can in effect be combined by using a triangular shaped magnet 55 as shown in FIG. 3 and moving it parallel to the Y-Axis. The region swept by the hypotenuse edge will be erased.

Figure 4:
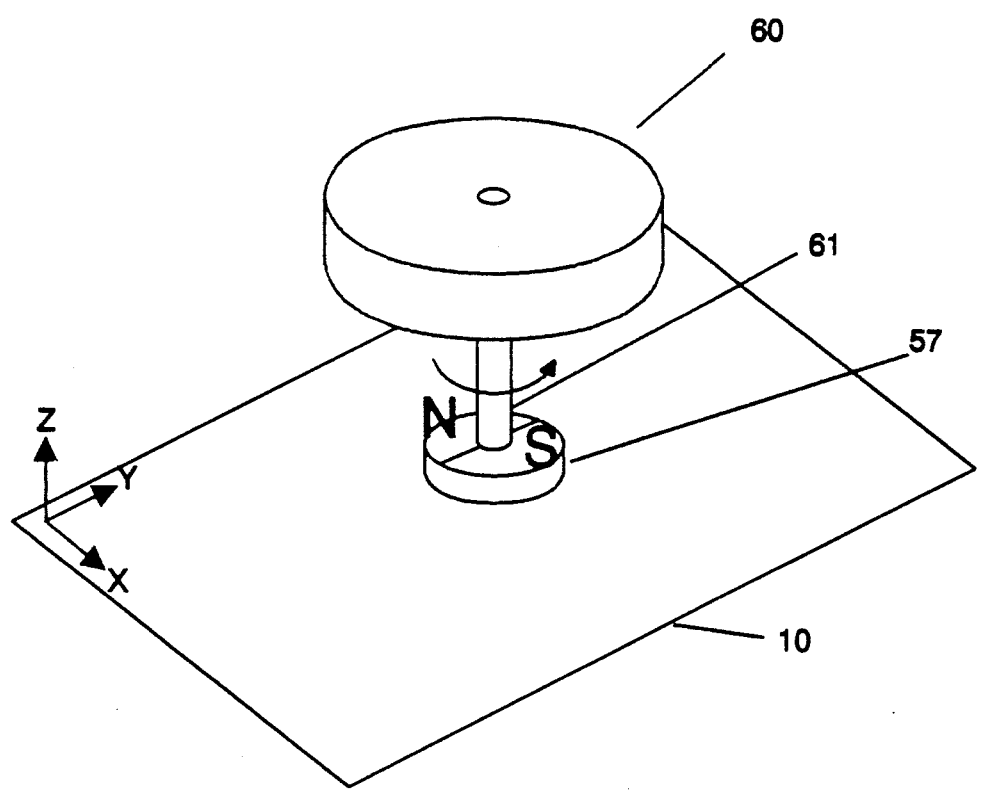
FIG. 4 shows a two pole disk permanent magnet 57 driven by motor 60 via shaft 61 and placed adjacent to the POP 10.

In a preferred embodiment of this invention, a multipole disk magnet 57 is rotated, say by an electric motor 60 via shaft 61 as shown in FIG. 4. The region around the periphery of magnet 57 is thus erased. As the disk magnet 57 is moved about the surface of the POP 10, it leaves behind a trail of erased region. Thus the erased region can be increased. It will be obvious to one skilled in the art that magnet 57 could actually be an integral part of an electric motor such as for example an axial field brushless direct current motor.

FIG. 5 A shows a magnetic stencil 70. The magnetic stencil comprises a high magnetic permeability material such as iron, nickel or cobalt or any of the numerous high permeability steels commercially available. The high permeability material 71,73 is shaped in the pattern to be written on the POP 10 and mounted on a non magnetic substrate 74, such as plastic or Aluminum. This pattern may be text or an image. FIG. 5 B shows another example of a magnetic stencil 77. It is made from a high permeability material with certain regions, such as 75 shaped in the pattern to be written removed.

FIG. 5 C shows a magnetic stencil 70 placed between the POP 10 and the erasure magnet 57. As the erasure magnet is moved about the surface of the POP 10 and stencil 70 the regions of the POP 10 lying under the high permeability regions experience time varying magnetic fields essentially normal to the POP 10 surface. These regions are thus turned dark while the rest of the region swept by the erasure magnet is turned light. A magnetic stencil may thus be simply a sheet of steel etched in the pattern to be written. Sheet steel of thickness between 1 to 2 mils have been found to produce good contrast. It is also possible to place the POP 10 between the magnetic stencil 70 and the erasure magnet. The region of the POP lying above the high permeability areas of the stencil will be turned dark. Thus, as stated as one of the objects of this invention, information can be written on the POP 10 irrespective of its previous state.

Figure 6:
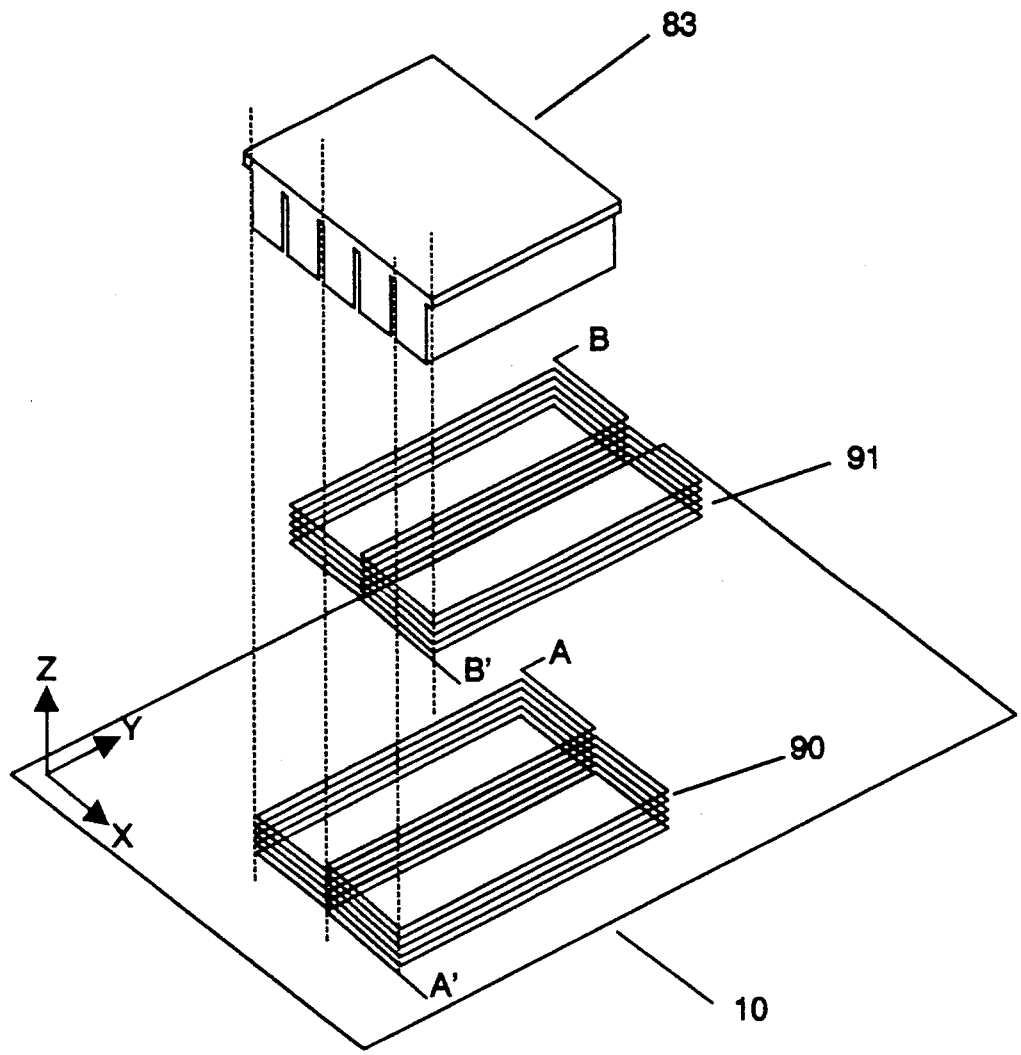
FIG. 6 shows an exploded view an electromagnet comprising steel core 83, coils 90 and 91 capable of being driven by a two phase power supply (not shown) placed adjacent to POP 10.

It is well known that the field of a permanent magnet can also be generated by using a coil of say magnet wire and passing therein a current. By using a set of such coils, and switching the coil currents to emulate the motion of the magnets described earlier, erasure of the POP can be achieved without any physical motion. An example of this arrangement is shown in FIG. 6. Two coils, 90 and 91 with terminals A,A' and B,B' are shown displaced from each other along the X-Axis. The coils are wound around a laminated steel core 83 to increase the field strength. By connecting coil terminals to a two phase power supply, a rotating magnetic field is created. This field is normal to the POP under the pole faces and is substantially parallel to the POP surface along the magnet edges. The effect is the same as moving the permanent magnet 53 of FIG. 2 parallel to the X-Axis. This approach requires no physical motion to cause erasure along the magnet edge.

Although the description above contains many specificities, these should not be construed as limiting the scope of the invention but as merely providing illustrations of some of the presently preferred embodiments of this invention. For example the disk magnet shown driven by a motor may be an integral part of the motor and may be mounted eccentrically to increase the erased area. Furthermore, the theory presented is based on the phenomenon believed to be occuring and is presented to aid one skilled in the art. However its correctness or otherwise should not influence the scope of this invention.

Thus the scope of the invention should be determined by the appended claims and their legal equivalents, rather than the examples.

I claim:

1. Apparatus for recording a visible image in a magnetic recording element comprising a plurality of magnetic flakes encapsulated and dispersed on a substrate, such recording being effected by selectively orienting such flakes, in accordance with visible image information to be recorded, either in a plane substantially parallel to said substrate, or in a plane substantially normal to said substrate, said apparatus comprising:

a stencil comprising a first region and a second region of differing magnetic permeability, said first region having a permeability substantially higher than the permeability of said second region, said first region and second region being imagewise configured to define image information to be recorded, said stencil being adapted to be positioned in close proximity to and opposite such magnetic recording element during a recording operation;

means for producing a magnetic field having a surface defining at least one pair of magnetic poles of opposite polarity, said surface being adapted to be disposed in a plane substantially parallel to and opposite said stencil during a recording operation; and means for producing relative movement between said magnetic field-producing means and said stencil to cause the magnetic flakes of that portion of a magnetic recording element located opposite said first region of said stencil to become oriented substantially normal to such substrate, and to cause the magnetic flakes of that portion of a recording element located opposite said second region of said stencil to become oriented substantially parallel to such substrate.

2. The apparatus as defined by claim 1 wherein said magnetic field-producing means is adapted to produce a change in direction of the magnetic flux in substantially the plane of the substrate in the portion lying opposite said second region of said stencil during relative movement between said magnetic field-producing means and a recording element closely spaced from and opposite said stencil.

3. The apparatus as defined by claim 1 wherein said magnetic field-producing means comprises a permanent magnet, and means for causing said permanent magnet to rotate about an axis substantially perpendicular to said pole-defining surface.

4. The apparatus as defined by claim 1 wherein said magnetic field-producing means comprises an electromagnet.

5. The apparatus as defined by claim 1 wherein the surface of said magnetic field-producing means defines two pluralities of magnetic poles of respectively opposite polarity.

6. A method for recording a visible image in a magnetic recording element comprising a multitude of magnetic flakes encapsulated and dispersed on a substrate by selectively orienting such flakes, in accordance with visible image information to be recorded, said method comprising the steps of:

arranging said magnetic recording element opposite and in close proximity to a stencil composed of a first region and a second region of differing magnetic permeability, said first region having a higher permeability than said second region, said first region and said second region defining visible information to be recorded;

overlying said recording element and stencil with a magnetic field-producing device having a surface defining at least a pair of magnetic poles of opposite polarity; and producing relative movement between said magnetic field-producing device and said stencil to cause the magnetic flakes of that portion of the magnetic recording element opposite said first region of said stencil to become oriented substantially perpendicular to the plane of said recording element, and to cause the magnetic flakes of that portion of the recording element opposite said second region of said stencil to become oriented substantially parallel to the plane of said recording layer.

7. The method as defined by claim 6 wherein said step of producing relative movement effects a rotation of the magnetic field vector in substantially the plane of the recording element lying opposite said second region of said stencil.

8. The method as defined by claim 6 wherein said step of producing relative movement comprises the step of rotating said surface about an axis substantially normal to the recording element.

9. The method as defined by claim 6 wherein said magnetic field-producing means comprises an electromagnet.

10. The method as defined by 6 wherein the surface of said magnetic field-producing means defines two pluralities of magnetic poles of respectively opposite polarity.

11. A magnetic recording system comprising:
(a) a magnetic recording element comprising a plurality of magnetic flakes encapsulated and dispersed on a substrate;
(b) a stencil comprising a first region and a second region of differing magnetic permeability, said first region having a permeability substantially higher than the permeability of said second region, said first region and said second region being imagewise configured to define image information to be recorded, said stencil being adapted to be positioned in close proximity to and opposite such magnetic recording element during a recording operation;
(c) means for producing magnetic field having a surface defining at least one pair of magnetic poles of opposite polarity, said surface being adapted to be disposed in a plane substantially parallel to and opposite said stencil during a recording operation; and
(d) means for producing relative movement between said magnetic field-producing means and said stencil to cause the magnetic flakes of that portion of a magnetic recording layer located opposite said first region of said stencil to become oriented substantially normal to such substrate, and to cause the magnetic flakes of that portion of a recording layer located opposite said second region of said stencil to become oriented substantially parallel to such substrate.

12. A magnetic erasing system for orienting a plurality of magnetic flakes encapsulated and dispersed in a magnetic recording layer, substantially parallel to the plane of said recording layer, comprising:
(a) said magnetic recording layer;
(b) a permanent magnet having a surface comprising a pair of opposing magnetic poles facing said magnetic recording layer; and
(c) means for rotating said permanent magnet about an axis substantially perpendicular to said surface in a manner to cause the magnetic flakes in the region of the magnetic recording layer lying close to the periphery of said opposing magnetic poles to experience a substantially inplane rotating magnetic field.

13. A method of uniformly orienting a plurality of magnetic flakes dispersed in a magnetic recording layer substantially parallel to said recording layer, said method comprising the steps of:
(a) providing a magnetic field-producing member having a magnetically poled face bearing a plurality of dissimilar poles from which magnetic flux emanates in a direction substantially normal thereto, said member producing magnetic flux substantially parallel to said face at the boundary edge thereof;
(b) arranging one surface of said layer in close proximity to said poled face of said member; and
(c) rotating said field producing member about an axis substantially normal to said poled face in a manner to cause the magnetic flakes lying in the region adjacent to the boundary edge of said magnet to experience a largely inplane rotating magnetic field.

14. The method of claim 13 further comprising the step of moving the rotating field-producing member substantially parallel to the surface of said layer whereby the area of the region where the magnetic flakes are aligned substantially parallel to the plane of the recording layer is increased.

15. The method of claim 13 wherein said field-producing member is a permanent magnet.

16. The erasing system of claim 12 further comprising means to move the rotating permanent magnet along the surface of the recording layer whereby the region where the magnetic flakes are aligned substantially parallel to the plane of the recording layer is increased.

* * * * *